United States Patent [19]
Cooperman et al.

[11] Patent Number: 5,710,110
[45] Date of Patent: Jan. 20, 1998

[54] OIL WELL DRILLING FLUIDS, OIL WELL DRILLING FLUID ANTI-SETTLING AND METHOD OF PROVIDING ANTI-SETTING PROPERTIES TO OIL WELL DRILLING FLUIDS

[75] Inventors: Murray Cooperman, Woodbridge; Keith R. McNally, Bedminster, both of N.J.; Will Mardis, Southampton; James Gambino, Yardley, both of Pa.

[73] Assignee: Rheox, Inc., Hightsown, N.J.

[21] Appl. No.: 440,961

[22] Filed: May 15, 1995

[51] Int. Cl.$^6$ .................. C09K 7/00; C09K 7/02
[52] U.S. Cl. .............. 507/131; 507/136; 507/138; 507/139
[58] Field of Search ................... 507/131, 136, 507/138, 139

[56] References Cited

U.S. PATENT DOCUMENTS

| | | | |
|---|---|---|---|
| 4,434,075 | 2/1984 | Madris et al. | 507/131 |
| 4,434,076 | 2/1984 | Madris et al. | 507/131 |
| 4,658,036 | 4/1987 | Schilling | 507/131 |
| 4,776,966 | 10/1988 | Baker | 507/131 |
| 5,034,444 | 7/1991 | Yun et al. | 507/131 |
| 5,254,531 | 10/1993 | Mueller et al. | 507/131 |
| 5,260,268 | 11/1993 | Forsberg et al. | 507/131 |
| 5,330,662 | 7/1994 | Jahnke et al. | 507/103 |

*Primary Examiner*—Philip Tucker
*Attorney, Agent, or Firm*—Michael J. Cronin

[57] ABSTRACT

An improved drilling fluid with enhanced anti-settling properties useful for all types of drilling systems is described. The invention includes a process for providing anti-settling properties to both oil and invert oil (i.e., water in oil emulsion) based fluids as well as the additive itself. The drilling fluid drilling mud invention contains at least one reaction product of which the reactants comprise an alkoxylated aliphatic amino compound and an organic polycarboxylic anhydride or acid and a rheologically active clay-based material.

14 Claims, 4 Drawing Sheets

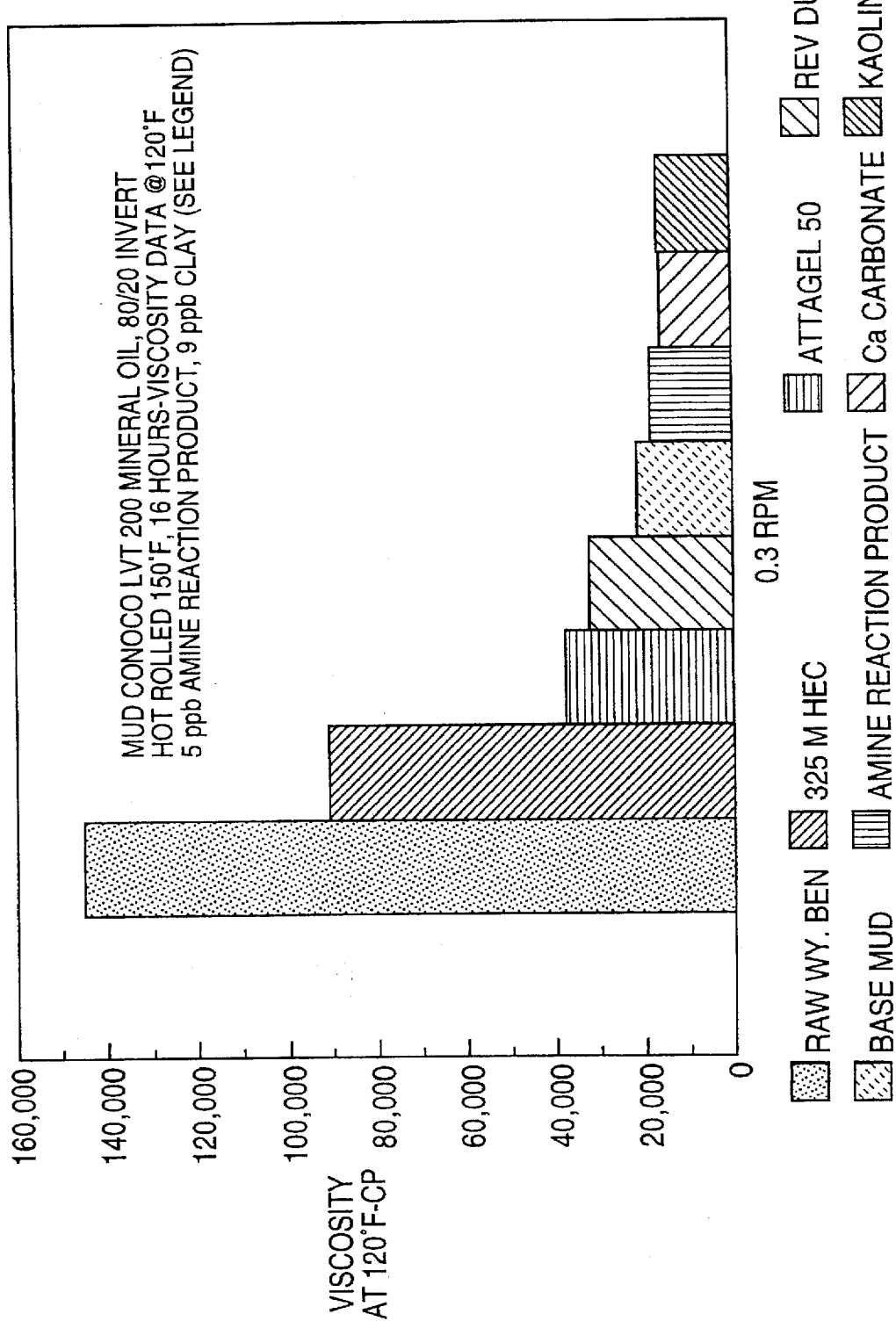

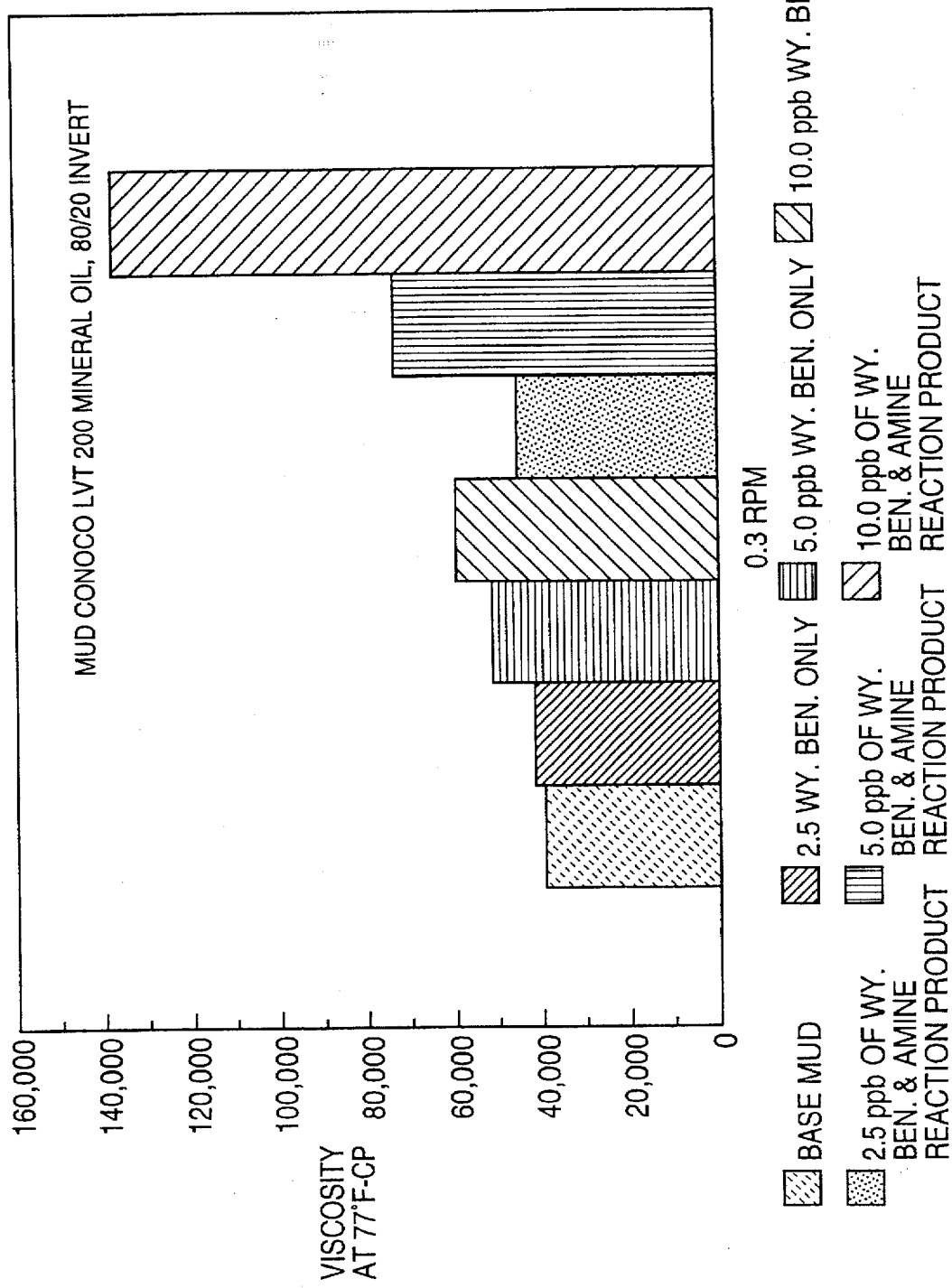

ns, OIL WELL
DRILLING FLUID ANTI-SETTLING AND
METHOD OF PROVIDING ANTI-SETTING
PROPERTIES TO OIL WELL DRILLING
FLUIDS

BACKGROUND OF THE INVENTION

Field of the Invention

The present invention relates to improved well bore fluids known in the oil service industry as drilling muds, and, in particular, to invert emulsion types of drilling fluids in which water is dispersed in an oil-based medium. The invention also includes anti-settling additives. The invention is particularly directed to providing enhanced anti-settling properties; that is, the ability of the fluids to retain in suspension in their structure, and to convey along with the fluid a variety of types of solid particles, the most important of which are bore-hole cuttings. These properties are particularly valuable when non-vertical directional drilling is undertaken.

DESCRIPTION OF THE PRIOR ART

Drilling Fluids

Since the end of the 19th century, the predominant drilling bit used in conventional commercial drilling of wells to discover and produce hydrocarbons and other substances has been the rotary drill bit. The rotary drill bit, having three abrasive rollers mounted at 120-degree angles to each other beneath a common hollow threaded shaft, was invented by Harold Hughes. In drilling, the rotary bit is inserted into the end of a "string" or collection of pipe sections, which is lengthened proportionally by the addition of extra pipe sections as the bit is rotated by turning the drill string, and the bit thereby cuts deeper into the earth's interior. More recently, motor-driven drill bits have been used where the entire string does not have to turn.

Since the beginning of United States rotary bit discovery drilling operations in Pennsylvania, Texas and Oklahoma, the oil industry has used "drilling mud" or drilling fluid. The mud is pumped under pressure down through the string of drill pipe, through the center of the drilling bit, then back up through the annulus between the outside of the drill stem and the borehole wall to the surface. Drilling base fluids, the liquid carriers of the mud, are often comprised of oils (diesel, mineral and poly(alpha-olefin)), propylene glycol, methyl glucoside, modified esters and ethers, water, and emulsions of oil and water of varying proportions.

A drilling mud must accomplish a number of interrelated functions for it to satisfy the minimum requirements for a commercial drilling fluid. These functions can be grouped as follows:

(1) The fluid must suspend and transport solid particles to the surface for screening out and disposal, (2) It must transport a clay or other substance capable of adhering to and coating the uncased borehole surface, both (a) to exclude unwanted fluids which may be encountered, such as brines, thereby preventing them from mixing with and degrading the rheological profile of the drilling mud, as well as (b) to prevent the loss of downhole pressure from fluid loss should the borehole traverse an interval of porous formation material, (3) It must keep suspended an additive weighting agent (to increase specific gravity of the mud), generally barytes (a barium sulfate ore, ground to a fine particular size), so that the entire column of drilling fluid is not interrupted upon encountering pressurized pockets of combustible gas, which otherwise would tend to reduce downhole pressure, as well as creating a "blowout" in which the fluid and even the drill stem are violently ejected from the well, with resulting catastrophic damages, particularly from fires, (4) It must constantly lubricate the drill bit so as to promote drilling efficiency and retard bit wear.

The interrelatedness of these functions can be seen by the fact that the unwanted materials to be removed at the surface can include not only "cuttings" from the material through which the bit is passing, but also pieces of the drill bit itself, the barytes or other weighing materials, and substances such as gellants, dissolved gases, and salts created when other fluid constituents become "spent" under the high temperatures encountered in deeper wells, and sometimes fuse in agglomerated particles. Thus, every substance added to achieve a desirable property, such as improved lubrication or pressure control, potentially results in the ultimate creation of a waste to be removed. In addition, every reformulation of a drilling fluid potentially alters the physical characteristics of the fluid in a way that inhibits the removal of unwanted ingredients.

Finally, it should be noted that a drilling fluid must perform its various functions not only when the drill bit is actively encountering the bottom of the borehole, but also at times when the drill stem is inactive, or is being removed or re-inserted for some purpose. In particular, cuttings must be held in suspension in the event of shut-downs in drilling.

ANTI-SETTLING PROPERTIES IN GENERAL

An ideal drilling fluid is a thixotropic system. That is, (1) it will exhibit low viscosity when sheared, such as on agitation or circulation (as by pumping or otherwise) but, (2) when the shearing action is halted, the fluid must set or gel to hold the cuttings in place, and it must become gelled relatively rapidly, reaching a sufficient gel strength before suspended materials fall any significant distance and (3) this behavior must be totally reversible. In addition, even when it is a free-flowing liquid, it must retain a sufficiently high viscosity to carry all unwanted particulate matter from the bottom of the hole to the surface. Moreover, upon long-term interruption of circulation, such as when drilling fluid has been ejected from the borehole into a quiescent holding vessel or pond, the gel structure should be such as to allow the cuttings and other unwanted particulates over time to settle out from the liquid fraction.

One of the principal problems facing "mud chemistry" scientists and technicians is the production of drilling fluids having satisfactory dispersibility, with the necessary subsidiary thixotropic properties discussed above, while at the same time possessing critically important anti-settling properties. Drilling muds and their composition have over the years involved the attention of both scientists and artisans, with thousands of various improvements made and patented. While the compositions of these various fluids is considered a "black art" to many, in reality, fluids and their additives involve highly complex chemical, physical and rheological analysis using state-of-the-art scientific apparatus and intricate mathematical calculations and modeling.

"Anti-settling" involves considerations of assurance of suspension and control of widely-varying matter covered under the general rubric "cuttings." It entails a different measure of control when shear rate and force is high, low, or non-existent, and requires control of syneresis and deposition of such particles over wide ranges of a) temperature (from 0° to as high as 300° C.), b) time durations, c) pressures (from only a few bars to those exerted by a column of fluid that can extend for thousands of feet) and d) drilling directions (from vertical to horizontal).

Accordingly, a search has been going on for many years for an improved additive for modifying and controlling the suspension properties of drilling fluids that would be efficient, easily handled, and readily dispersible in a broad range of drilling muds, and usable under a broad range of conditions.

TYPES OF DRILLING MUDS

In rotary bit systems, the most common for drilling subterranean oil or gas wells, the drill bit cuts into the natural earth and stone formations, thus "creating the hole," and by the drilling action produces cuttings. The function of the drilling fluid is to remove these cuttings as drilling continues, so as to prevent increasing friction within the system from "freezing" or binding up the drillstem.

Drilling fluids or muds are typically classified according to their base fluid or continuous phase, as water base muds and oil base muds. Drilling muds may contain a mixture of base fluids, and are typically classified by the predominating or continuous base fluid, with the fluid present in lesser quantities becoming the internal or emulsified phase.

Oil base muds, for example, may have an aromatic or aliphatic oil, or a mixture of oils, as the continuous phase. These oils may include diesel, mineral or synthetic (PAO, esters, ether) oil. They may be comprised entirely of oil or, more commonly, may contain water ranging from 5% to upwards of 50%. In this mud, water becomes the internal phase, is emulsified into the oil, as a heterogeneous fine dispersion and the resulting system is referred to as a oil-based or oil-invert emulsion mud. Oil-invert emulsion drilling fluids generally used in the United States consist of a three-phase system: oil, water and fine particulate solids. The aqueous phase may be a brine. The addition of brine reduces the overall price of the fluid, reduces the risk of combustion of the oil, and improves the water acceptance of the mud. The brine of choice is commonly an aqueous solution of an inorganic salt such as sodium chloride or calcium chloride.

Water base muds may utilize either fresh water or brine as the continuous phase.

The final class of drilling fluids, in addition to water muds and oil muds, are pneumatic fluids, in which drill cuttings are removed by a high velocity stream of air or another gas, including natural gas.

Emulsifiers, weight agents, fluid loss additives, salts and numerous other additives may be contained or dispersed into the mud to improve its performance with respect to one or more properties. These additives may be organic or inorganic in nature.

CIRCULATION OF DRILLING MUD

As was noted above, to remove cuttings, drilling fluid is pumped under pressure down through the string of drill pipe, through the center of the drilling bit, then through the annulus between the outside of the drill stem and the borehole wall, back up to the surface. This circulation constantly removes the cuttings from the instantaneous bottom of the hole, and lifts them the entire distance from this bottom to the surface for disposal. Such a distance can be in the thousands or tens of thousands of feet.

It is desirable for the drilling fluid to possess less dynamic anti-settling properties when being circulated down the drill pipe and out the bit, and to have higher anti-settling properties while rising through the annulus. Unless cuttings are removed from beneath the bit before the next bit tooth arrives, the cuttings can be reground into a finer particle size, and made more difficult to remove by screening. The presence of unremoved cuttings in the fluid will decrease drilling penetration rates, with resultant increase in the overall costs of drilling the well. Once in the annulus, the cuttings, which are generally denser than the drilling mud itself, tend to settle downward under the influence of gravity. The upward velocity of the drilling fluid in the annulus must be higher than the settling rate, so as to bring the cuttings to the top of the hole. Higher anti-settling properties in the annulus than at the drill bit will reduce this settling rate.

The bit cuts into the earth, causing the cuttings to accumulate as drilling continues and the depth of the hole increases. A drilling fluid used to carry these cuttings to the surface for removal must allow the bit to continue functioning, and the ever-deepening bottom hole where the bit is cutting to be kept clean and free of cuttings at all times. As the hole deepens, the total amount of fluid involved will increase, and the difference between surface conditions and those experienced down-hole will increase. Note that where a hammer drill or other non-rotary drilling system is used, a drilling fluid or the equivalent will still be needed to remove the bore hole cuttings and to perform the other above-described functions normally performed in rotary drilling systems by drilling fluids.

OFF SHORE DRILLING

In modern times, hydrocarbon drilling for exploratory and production wells has increasingly been done from platforms located in water settings, often called off-shore drilling. Both deep-sea and shallow fresh and salt water drilling employ either floating barges or rigs fixed in some fashion to the submerged surface of the earth. Drill cuttings removed from the bore-hole must either be discharged to the surrounding body of water or transported to a remote location; the liquid phase of spent drilling fluid must similarly be disposed of. The disposal of cuttings may be inhibited by the presence of harmful substances adhering to cuttings particles, whether oil from the fluid or a material encountered in the borehole. Cuttings can be cleaned to some extent by the use of vibrating screens or other mechanical separation devices, by washing techniques, and by chemical treatments. However, because of possible pollution to the environment, particularly the marine environment, the off-shore disposal of drilling fluids as well as of cuttings is increasingly discouraged. Rather, both the fluids and the cuttings are separately collected and transported to on-shore sites for rejuvenation or disposal.

The invention discloses new drilling fluids, particularly oil invert drilling muds, which are distinguished by improved anti-settling properties, high ecological acceptability, and at the same time good storage and application properties. One important area of application for the new drilling fluid systems is in both on- and off-shore wells for the development of hydrocarbon deposits, the aim of the invention being particularly to make available industrially usable drilling fluids with enhanced anti-settling properties. The use of the new drilling fluid systems has particular significance in the marine environment, but is not limited to this field. The new mud system also can be put to use in land-based drilling operations beyond hydrocarbons, for example, in geothermal wells, bore-holes for water, deep waste injection-disposal wells, geoscientific bores, and solution-extraction mining bores such as those for common salt.

A number of other additives besides anti-settling additives, providing other properties, can be used in the fluid so as to obtain desired application properties, such as, for example, rheological additives regulating viscosity, emulsifiers or emulsifier systems, weighting agents, fluid loss-prevention additives, wetting additives, and alkali reserves. Invert emulsion drilling fluids are described at length in U.S. Pat. No. 4,435,636, obtained by NL Industries, Inc., the parent company of the assignee herein.

The use of the invert oil-based drilling fluids or muds, for example in oil exploration, is increasing rapidly owing to the more demanding requirements encountered in drilling deep and/or non-vertical and deviated wells. Compared with the longer-established water-based drilling muds, they possess a number of advantages, including reduced interaction with earth formations, greater thermal stability and improved lubricity. While the drilling fluids and methods of this invention are particularly useful in invert emulsion systems, they may also find use in the other oil-based muds previously discussed.

DIRECTIONAL DRILLING

The requirements for drilling fluids with enhanced anti-settling properties have become more complex over the past decade as a result of improvements in directional drilling technology, in which at least a portion of the well is drilled at an angle other than vertical. Such wells are also known as deviated wells.

Procedures for deviating wells have improved greatly over recent years with the introduction of more powerful and reliable downhole motors, and the introduction of more accurate techniques utilizing wireline techniques as well as the latest computerized downhole, sensing and micro-reduction equipment, including improvements in sounding apparatus and microwave transmission. These techniques are collectively referred to as Measurement While Drilling (MWD) techniques, because they permit the obtaining of data relating to down-hole conditions without the need to remove the drill string.

The advantages of directional drilling are well-known: it allows (1) the salvaging of boreholes blocked by debris (such as tools which have become inextricably lodged); (2) the use of more economical land-based equipment to explore the immediate off-shore environment; and (3) the drilling of multiple wells up to several miles from one another, sharing the cost of a single platform. In certain formations, increased production can be achieved by deviating the well off-vertical so as to facilitate perforation and development of a narrow producing zone, or redevelopment of a depleted formation.

Use of a downhole motor allows the hole to be deviated by the introduction of a fixed offset or bend just above the drill bit. This offset or bend can be oriented by modern MWD systems which are capable of reporting accurately the current bit and toolface hole angle and azimuth (i.e. the orientation with respect to the upper portion of the hole). It is accordingly possible to rotate the drill string until the toolface has achieved the desired direction of deviation, and then to fix the drill string in place and commence the deviation by starting the motor to extend the hole in the desired deviated direction.

There are, however, a number of inherent problems in this approach to directional drilling, which affect the anti-settling requirements of a drilling mud; namely:

(1) The annulus carrying the mud with cuttings to the surface is no longer vertical and extended in distance versus vertical wells.

(2) Gravity on a horizontal hole pulls cuttings, weighting material and particulate matter, not controlled by the drilling fluid, to the bottom side of the bore (not the bottom of the hole as in traditional drilling) and results in drag on the bore wall.

(3) Horizontal "pay-out" zones, in view of their substantial length, are more susceptible to settling formation damages and a resultant loss of flow efficiency.

(4) The amount of drilling mud required is increased since the distances are greater, and the time required for the cuttings to reach the earth's surface also increases.

In order to obviate or mitigate these problems, which can cost oil and gas companies millions of dollars per hole, it is an object of the invention to provide drilling fluids with anti-settling properties particularly appropriate for directional drilling apparatus, and methods whereby the offset or bend (toolface) can be created dynamically such that the drill may be rotated. There is preferably also an ability to change the toolface direction while the drill pipe string is rotating, in order to correct any deviation of hole caused by external influences, e.g., formation change or dip angle, without loss of control of the cuttings.

Two patents obtained by companies related to assignee describe drilling fluid additives. U.S. Pat. No. 5,021,170 describes a viscosifying gellant for oil-based well bore fluids comprising a mixture of an organic clay and a sulfonated, ethylene/propylene/5-phenyl-2-norbornene terpolymer. U.S. Pat. No. 4,486,316 shows a drilling fluid comprising an aqueous dispersion of an emulsion polymerized latex comprised of an interpolymer of an olefinically unsaturated carboxylic acid monomer and at least one other, non-carboxylated polymerizable monomer, the latex being of a type which undergoes rapid increase in viscosity upon the addition of a sufficient amount of a basic material.

U.S. Pat. No. 2,999,063 describes adding a mixture of a particular class of amine and metallic soap to a mixture of water in oil and describes that the mixture provides emulsion properties to drilling and packing fluids. U.S. Pat. No. 4,374,737 relates to a drilling mud composition having non-polluting, non-diesel fuel-based properties. The invention is directed to a non-polluting additive for improving the rheological properties of drilling muds consisting of the following ingredients: a diethanolamide of a specific formula, tall oil fatty acid and an imidazoline/amide mixture consisting essentially of three specifically defined chemicals.

U.S. Pat. No. 5,254,531 describes oleophilic basic amine additives for invert drilling muds to regulate the flowability and pumpability of the drilling mud. The patent describes adding to the mud, containing an esterified oil, a basic amine compound having an oleophilic character and limited solubility in water and thereby forming in situ in the drilling mud an oil-soluble salt with said amine compound and a carboxylic acid formed by hydrolysis of the ester. The esters are preferably obtained from vegetable starting materials, as well as from fish oils. U.S. Pat. No. 3,879,298 shows a method of controlling the rheology of a fresh water drilling fluid contaminated with salt by incorporating therein an ethylenedicarboxylic acid and a method employing such a contaminated drilling fluid containing said ethylenedicarboxylic acid, and a drilling fluid additive consisting of said ethylenedicarboxylic acid. The additive may comprise maleic acid, maleic acid anhydride, and mixtures thereof.

U.S. Pat. No. 4,781,730 describes an alkali metal or alkaline earth metal-containing composition (with or without a hydrocarbon-soluble dispersant) which are combined with the reaction product of a carboxylic acid and a polyhydroxyalkanolamine, with the preferred reaction product being an ester which forms between the hydroxyl moieties of the alkanolamine and the carboxylic acid (anhydride). The resultant compositions are discussed as useful for valve seat recession protection in internal combustion engines. The reaction product of the carboxylic acid and polyhydroxyalkanolamine acts as a demulsifier for the alkali metal or alkaline earth metal-containing composition. The patent describes a composition comprising a hydrocarbon-soluble or dispersible alkali metal or alkaline earth metal containing composition, and the reaction product of a polybasic acid and a polyhydroxyalkanolamine of the formula $RN[(AO)_xH][(DO)_yH]$. The polybasic acid may be either an acid or an anhydride, and is preferably a dicarboxylic acid.

U.S. Pat. No. 5,034,444 issued to one of the inventors hereof, describes a rheological additive for non-aqueous paints and coatings, especially high solids coating compositions, including baking enamels, air-dry paints, resins and epoxies. One type of such rheological additive is described as the reaction product of an alkoxylated aliphatic nitrogen-containing compound and an organic polycarboxylic anhydride or acid, with the preferred reaction product an ester.

Japanese Patent Application No. 62-69957 describes a sag preventer for non-aqueous coating materials comprising a mixture of two different fatty acid amides wherein fatty acid amide (A) is obtained by reacting a mixture of at least one straight chain saturated fatty acid having 3-4 carbon atoms and 12-hydroxystearic acid (the molar ratio of the fatty acid and 12-hydroxystearic acid being 1:9-8:1) and ethylene diamine or hexamethylene diamine and fatty acid amide (B) is obtained by reacting a mixture of at least one straight chain saturated fatty acid having 6-22 carbon atoms and 12-hydroxystearic acid (the molar ratio of the fatty acid and 12-hydroxystearic acid being 0:10-8:2) and ethylene diamine or hexamethylene diamine, wherein the weight ratio of fatty acid amide (A) to fatty acid amide (B) is 100:00-20:80.

BRIEF DESCRIPTION OF THE DRAWINGS

In FIG. 1B, the low shear viscosities of drilling muds formulated with the amine salts of the present invention and various small particle size materials are plotted. This graph demonstrates that the amine salts of this invention are effective when, and only when, they are used in combination with rheologically active clays. The amine salts themselves and the salts in combination with non-rheolically active clays and other small particle size materials, such as calcium carbonate and kaolin, are shown as ineffectual in improving the low shear viscosity of the drilling mud.

FIG. 2 further displays the synergy between the amine salts of this invention and rheologically active clays in improving the low shear viscosity of a drilling fluid. While the addition of a swelling, rheologically active clay—in this case, Wyoming bentonite, a swelling smectite-type clay—leads to a an increase in the low shear viscosity of the drilling fluid, a more dramatic effect is accomplished by adding with the clay an equal weight of a mixed amine salt, here N,N-bis[2-hydroxyethyl]octadecylamine and the hydrolysis products of maleic and phthalic acid anhydrides.

SUMMARY AND OBJECT OF THE INVENTION

Figure 1A:
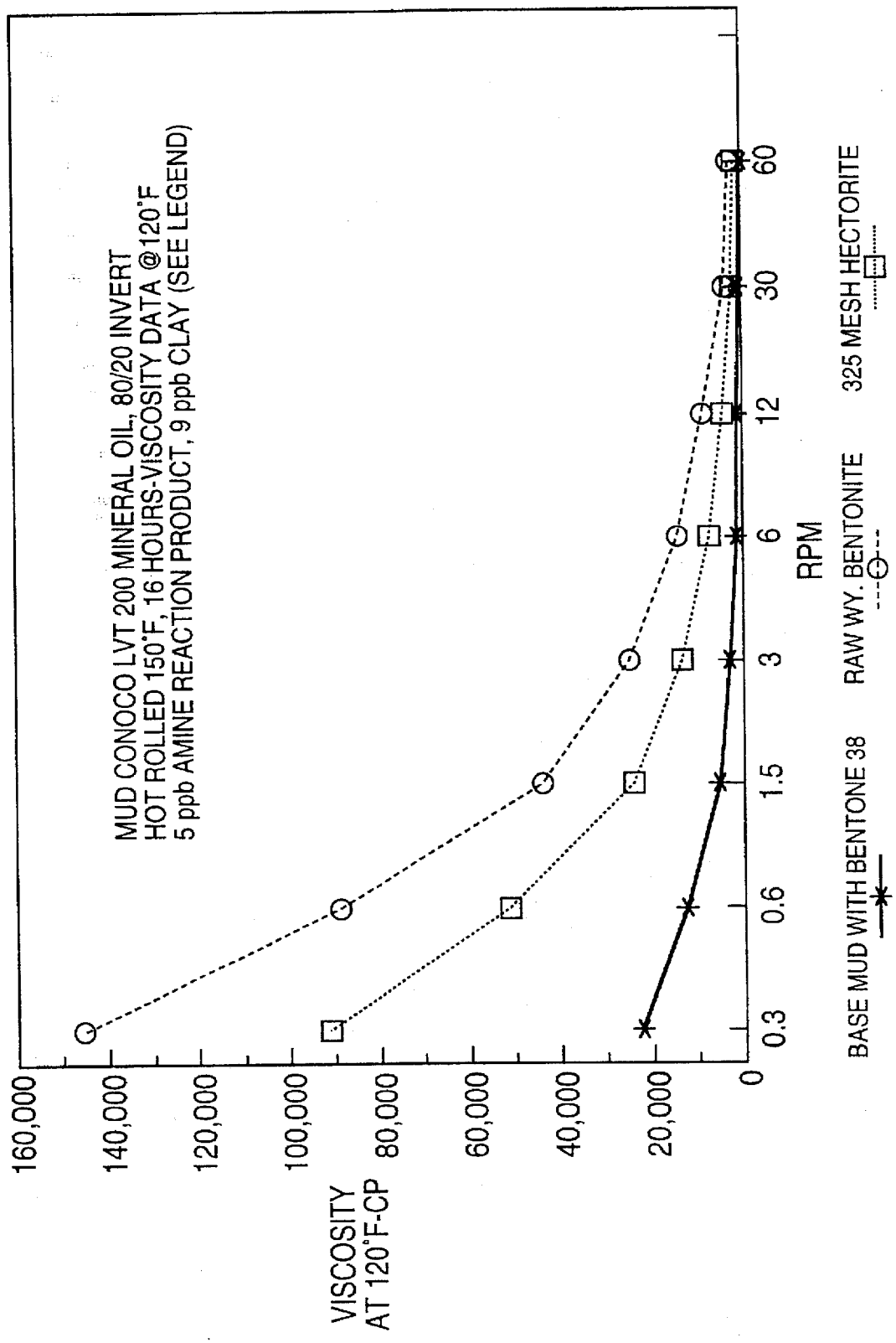
FIG. 1A visually shows that ideal anti-settling behavior has been achieved with two embodiments of the instant invention (a defined amine salt and bentonite and hectorite clay). In this figure, the viscosities of drilling muds formulated with and without the amine salts and clays of this invention at varying Brookfield LVT Viscometer rotational speeds (i.e., shear rates) are plotted; this graph clearly demonstrates a dramatic improvement in the low shear viscosity of the fluid using the inventive additives with only a very modest increase in the high shear viscosity.

The present invention overcomes the problems and disadvantages of the prior art by providing a drilling fluid with anti-settling properties which provides excellent cutting suspension properties. An additional object of the invention is to provide a process for improving the anti-settling properties of drilling muds.

It is an object of the invention to provide a drilling fluid that has suspension properties for containing various solid particles, including bore-hole cuttings for directional drilling and weighting materials, that is easy to handle and use. It is yet another object of the invention to provide stable suspensions of solid particles in drilling muds that do not exhibit excessive syneresis or "hard settling" during drilling operations.

It is another object of the invention to provide a drilling mud containing the anti-settling compositions hereof as a mixture of the defined amine salts and a clay material, which material includes organoclays, clays such as smectite clays including hectorite, sodium bentonite and calcium bentonite, and mixtures of such materials.

Additional objects and advantages of the invention will be set forth in part in the description which follows, and in part will be obvious from the description, or may be learned by practice of the invention. The objects and advantages of the invention will be realized and attained by means of the instrumentalities and combinations particularly pointed out in the appended claims.

To achieve the objects and in accordance with the drilling fluid composition purpose of the invention, as embodied and broadly described herein, the invention provides drilling fluid compositions containing a reaction product wherein the reactants are one or more alkoxylated aliphatic amino compounds and an organic polycarboxylic anhydride or acid, and a clay based material.

The drilling fluid described herein has excellent anti-settling properties which are particularly advantageous when employed in deviated bore holes. The fluid is effective both at high shear conditions (obtaining when the rotary drilling bit is activated), and while the bit is "turned off." Importantly the additives of this invention work when the bit is "idling," or turning at slow speed; with prior art additives, such conditions provide sufficient shear to break the thixotropic structure of the clay used, but were insufficient to maintain the suspension of the cuttings; i.e., the settling rate of the particulates became greater than the mud's circulation rate. The mud formulated with the additives of this invention retains in suspension the cuttings contained therein against the settling pull of gravity when the spent mud is moving toward the earth's surface. Such fluid is effective at both normal and high temperatures, and at both low and high pressures.

The invention also provides a process for improving the rheological and suspension properties of drilling fluids relating to cuttings containing solid particles, comprising adding the anti-settling composition or compositions of the invention to a drilling mud using known procedures.

Reference will now be made in detail to the present preferred embodiments of the invention.

DESCRIPTION OF THE PREFERRED EMBODIMENTS

As detailed above, the invention herein involves an improved drilling fluid with enhanced anti-settling properties useful for all types of drilling systems. The drilling fluid of the present invention contains at least one reaction product of which the reactants comprise an alkoxylated aliphatic amino compound and an organic polycarboxylic anhydride or acid, and a rheologically active clay based material.

As noted earlier, to be effective, a drilling mud should exhibit both high viscosity at low shear rates in order to maintain the cuttings in suspension and low viscosity at high shear rates to facilitate pumping; such shear thinning property is generally called thixotropy by those skilled in the art, and is generally accomplished by the addition of thixotropes, such as organically modified smectite-type clays, to the drilling fluid. The use of these thixotropes permits the formulator to adjust the low shear performance of the mud to achieve the desired suspension and cuttings removal properties. These materials, however, simultaneously cause a small but still undesirable increase in the high shear viscosity of the drilling mud. In an ideal drilling mud, the high shear viscosity would approach that of the liquid free of thixotropy.

The alkoxylated aliphatic amino compound utilized most preferably in the invention has a chemical structure represented by the following formula:

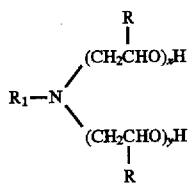

wherein $R_1$ is a straight or branched chain aliphatic alkyl group having 6 to 30 carbon atoms, preferably 8 to 20 carbon atoms and most preferably 12 to 18 carbon atoms. Especially preferred is where $R_1$ is a fatty alkyl having 12 to 18 carbon atoms, such as soya, tallow, hydrogenated tallow, coco, and mixtures thereof. R is independently selected and can be a hydrogen, methyl group or ethyl group, both x and y are at least 1, and the sum of x+y is from 2 to 50, preferably from 2 to 15 and most preferably from 2 to 10.

Illustrative alkoxylated aliphatic amino compounds represented by the above formula include tertiary amines having one fatty alkyl group derived from various fatty sources having 12 to 18 carbon atoms and at least two polyoxyethylene or polyoxypropylene groups attached to the nitrogen. Polyethoxylated aliphatic amine polyols of this type are commercially available and marketed by Akzo Nobel Chemicals Inc. under the trade name ETHOMEEN, for example ETHOMEEN® 18-12.

It is to be understood that the above are representative, commercially available products and other types of alkoxylated aliphatic amino compounds are also useful for preparing the drilling fluids of this invention.

As noted above, the alkoxylated aliphatic amino compound is reacted with an organic polycarboxylic anhydride or acid; we refer to this reaction product as the amine additive. If a polycarboxylic anhydride or acid is used, various known compounds can be selected and are normally made from selected raw materials during reaction with the alkoxylated aliphatic amino compound. It is preferred to use an organic polycarboxylic anhydride with 1-10 carboxylic anhydride groups or its corresponding acid, preferably 1-5 carboxylic anhydride groups or its corresponding acid, and most preferably one with 1-2 carboxylic anhydride groups or its corresponding acid. Various polycarboxylic anhydrides and acids are useful in creating the reaction product.

Illustrative examples include maleic anhydride or its corresponding acid reacted with phthalic anhydride or its corresponding acid, pyromellitic dianhydride or its corresponding tetra acid, biphenyltetracarboxylic dianhydride or its corresponding tetra acid, benzenophenonetetracarboxylic dianhydride or its corresponding acid, 5-(2,5-dioxotetrahydrofuryl)-3-methyl-3-cyclohexene-1,2-dicarboxylic anhydride or its corresponding acid and the like. Additional polycarboxylic acids include succinic anhydride or its corresponding acid, glutaric anhydride and its corresponding acid, azelaic acid, adipic acid, 1,6-hexane dicarboxylic acid, 1,8-octane dicarboxylic acid, 1,10-decane dicarboxylic acid, and mixtures thereof. Of the foregoing compounds, maleic anhydride and its corresponding acid, phthalic anhydride and its corresponding acid, and mixtures thereof are preferred.

It is generally more preferred for economic reasons to use an organic polycarboxylic anhydride instead of its corresponding acid. It has been found however that phthalic acid is preferred over phthalic anhydride and that if phthalic anhydride or a like anhydride is used, a small amount of water should be provided. The reaction product of the reaction of polyoxyalkylated amino compounds such polyalkoxylated amine and an organic polycarboxylic anhydrides and acids may be anticipated to be esters; said reaction products resulting from the reaction of the reactants may be generally identified by infrared analysis after volatiles are removed. Two strong bands for the ester carbonyl of COOR and carboxylate of $COO^-$ may be observed at 1725 and 1590 $cm^{-1}$ respectively. The salts formed from the acid-base reaction of the polyalkoxylated amine and the carboxylic acids and/or the hydrolysis products of acid anhydrides are especially effective as sag-reducing agents for oil invert drilling fluids when used with rheologically active clay based materials. Though not intended to be bound to a product, instead of a reaction product, it is surmised that the preferred reaction products for use in drilling fluids are esters and amine salts of the type:

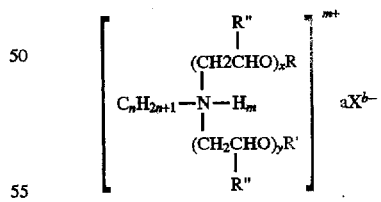

wherein: R and R' are selected from the group consisting of hydrogen and the residues of the reaction of the polycarboxylic acids (anhydrides) with the hydroxyl moieties of the poly(oxyalkylene) radicals of the polyoxyalkylated amine, R" is selected from the group consisting of hydrogen, methyl and ethyl radicals, and m is either 0 or 1, X is a carboxylate anion formed by the acid-base reaction of the amine and polycarboxylic acid(s), and m=a×b.

To further enhance the anti settling properties of the drilling fluid according to the present invention, additional reactants may, in some instances, be used in the synthesis.

As can be understood from the foregoing discussion, any combination of the above-described amino compounds may be used with any combination of the above-described polycarboxylic anhydrides and/or acids in the synthesis. The above reaction products may be synthesized in conventional continuous or batch processes either with or without organic solvent. When a solvent is used, the reactants will still form an excellent additive. For example, if a non-solvated product is a solid or non-pourable, the use of a solvent as a carrier may be necessary to produce a fluid product. For use in drilling muds, a preferred physical form of the product is typically a flowable liquid for ease of handling characteristics. Also, if all or some of the reactants are solids, it may be necessary to use a solvent to facilitate the reaction.

When a solvent is used during synthesis, whether or not the organic solvent is polar or non-polar is not particularly critical. However, a preferred solvent for synthesizing the reaction product of the present invention is a higher methylated ketone such as methyl ethyl ketone, methyl propyl ketone, methyl isobutyl ketone, and methyl isoamyl ketone. Although limited only by the particular reactants and reaction conditions, the solvent should generally be used in an amount of from 0 to about 90, preferably from 0 to about 80, and most preferably from 0 to about 50 percent by weight based on the total weight of the reaction mixture. More preferable is to conduct the reaction in water. When water is used as the solvent, it may be used in amounts of from 0.1 to about 95, preferably from 0.1 to about 80; and most preferably from about 0.1 to 65 percent of the reaction mixture.

The compounds can be prepared in a neat (i.e., solventless) reaction, followed by dispersion in water or other solvent. The preparation by a solventless reaction can be complicated by the formation of some amount of ester (the product of the reaction of an acid or acid anhydride and the hydroxyl moiety of the polyoxyalkylene radical(s)), which ester has limited water solubility and becomes highly viscous. Care has to be exercised to ensure that the reaction does not proceed too far; avoidance of preparation of the ester can be accomplished altogether by conducting the reaction(s) under conditions and with reactants such that ester formation is not favored. For instance, preparing these additives in water largely ensures that the anhydrides will react with (the very high concentration of water) rather than the low concentration of poly(oxyalkylene radical) hydroxyls. The temperature may be kept low, which does not favor ester formation. We have found that an additive prepared by simply making a solution of ETHOMEEN® 18-12 (an ethoxylated fatty amine), maleic and phthalic acids is equivalent in performance to one prepared by other techniques. The solventless procedure, which led to some variable amount of an ester, led ultimately to a high viscosity product even at 20% solids in water.

A preferred amine additive composition is produced in water and under mild reaction conditions; it is pourable at 35% or greater solids at ambient temperatures. Since no reaction must or does (other than the inevitable acid-base reaction) occur under these reaction conditions, batch adjustment, if required, is facilitated.

The reaction temperature to be used in the synthesis may be varied, but preferably ranges from ambient temperature to 300° C.; more preferably, the temperature ranges from ambient to 200° C., and most preferably from ambient to about 100° C. In some instances, ambient temperature may be the most preferred reaction temperature since polyoxyalkylene amine polyols are so reactive with particular dicarboxylic anhydrides that the reaction takes place at room temperature without heating or a catalyst. An example of such a reaction is the synthesis of the 2:1 (molar ratio) reaction product of maleic anhydride and ETHOMEEN® C-20. From an economic standpoint the most preferred reaction temperature will be the lowest temperature at which the reactants are, or will become, solubilized within a reasonable time period.

A catalyst may also be used in the synthesis of the rheological additives of the present invention. If a catalyst is used in the synthesis, it may be selected from any of those typically used in conventional condensation reactions. Examples of such catalysts include esterfication catalysts, such as dibutyl tin oxide, tetraalkyl tin or titanium compounds, and the like. More preferred are dibutyl tin dilaurate and sodium hydride. Although limited only by the particular reactants and reaction conditions, the catalyst should generally be used in an amount of from about 0.001 to 2.0 percent by weight based on the total weight of the reactants.

With respect to syntheses, the mol ratio of the reactants may vary. Typically, in a solventless or reaction conducted in an inert solvent, as the amount of polycarboxylic anhydride or acid that reacts with the alkoxylated aliphatic amino compound is increased, the molecular weight of the resulting polyester increases proportionally indicating a formation of higher molecular weight polymers. The amine additive reaction products can be added to drilling fluids in amounts ranging from about 0.01 to about 5% by weight using conventional additive and mixing techniques.

We have found that, to obtain particularly improved anti-settling properties for drilling fluids, it is important that the aforementioned amine additive reaction products be mixed with one or more clay-based materials which are inherently rheologically active. Such materials include organoclays, smectite-type clays including Wyoming bentonite, beneficiated sodium and calcium bentonite (sold under the designation Rev Dust) and hectorite, and attapulgite clay. Organoclays and methods of making them are described, for example, in assignee's recent U.S. Pat. Nos. 5,075,033, 5,130,028, and 5,151,155, the disclosure of which is incorporated by reference. Smectite-type clays are cation-exchangeable clays described at length and by chemical formula in assignee's U.S. Pat. No. 5,350,562. Bentonite, a particularly useful clay for this invention, is described at length in Carr, Industrial Minerals and Rocks, 6th Edition (1994) in a chapter entitled *Bentonite*, authored by Drs. Elzea and Murray of Indiana University. Attapulgite clays are well known natural clays which possess cation exchange capacity but of a lower amount than smectite-type clays such as bentonite and hectorite.

An increase in anti-settling properties is achieved from this mixture combination within broad ranges of amine to rheologically active clay. Alternative ways of preparing a drilling fluid according to this invention are to add such cation exchangeable clay-based material to the drilling fluid separately from the above mentioned amine reaction products, to add the amine additive to the drilling fluid when the fluid is being used to drill through domains containing rheologically active clays, or to add the amine alone if the drilling fluid already contains such clay-based materials.

Though not wishing to be bound by the following, we speculate that the function of additives of this invention is to form amine-reacted clay by reaction with and/or adsorption onto the surfaces of clays and/or organoclays which are either deliberately incorporated prior to or mixed with the amine additive and/or become incorporated into the drilling mud during its use. Such amine-reacted clay would be anticipated to be in highly dispersed state and would be anticipated to have substantial anti-settling activity.

The following examples are presented to illustrate the invention and should not be considered limiting. EXAMPLES 1 to 6 describes methods of making the amine salt portion of the invention.

EXAMPLE 1

Reaction Product of Maleic Anhydride:Polyoxyethylene [10](Coco Alkyl) Amine

To a reaction flask were added 51 g (0.0816 mol) of ETHOMEEN® C-20, a 10 mol ethoxylate of coco amine supplied from Akzo Nobel Chemicals Inc. and having a molecular weight of 625, and 80 mL of methyl isoamyl ketone. The mixture was heated to 100° C. under agitation. 4.0 g (0.0408 mol) of powdered maleic anhydride was then added and completely dissolved in the ETHOMEEN® C-20:MIAK solution by applying high speed agitation at 110° C.; 0.02 g of dibutyl tin dilaurate was added as a catalyst and the reaction temperature was maintained at 110° C. for 4.0 hours. The reaction flask was blanketed with a nitrogen gas atmosphere with slow nitrogen flow during the reaction.

Upon completion of the reaction, the liquid product was cooled to room temperature. 1.0 to 2.0 g of the sample was taken and dried in a vacuum oven at 80° C. for several hours. The percent solids of the liquid product was determined at 54.9%. The mol ratio of the product was 1.0:2.0 for maleic anhydride:ETHOMEEN® C-20.

The product was characterized by infrared analysis which showed strong absorption of ester carbonyl (COOR) at 1725 $cm^{-1}$ and carboxylate (COO$^-$) at 1590 $cm^{-1}$.

EXAMPLE 2

Reaction Product of Maleic Anhydride:Phthalic Acid:Diethoxylated Octadecylamine

To a reaction flask, 14.6 g (0.04 mol) diethoxylated octadecylamine having a molecular weight of 357 (ETHOMEEN® 18-12, supplied by Akzo Nobel Chemicals Inc.) and 30 mL of methyl isoamyl ketone (MIAK) were charged. The mixture was homogenized and heated to 110° C.; 6.0 g (0.06 mol) of powdered maleic anhydride and 3.3 g (0.02 mol) of phthalic acid were added and completely dissolved in the ETHOMEEN® 18-12:MIAK solution at 100° C. with agitation.

Dibutyl tin dilaurate (0.01 g) of was added, and the reaction temperature maintained at 100° C. for 4.0 hours. The whole reaction system was covered with a nitrogen gas atmosphere for the entire reaction period.

Upon completion of the reaction, the liquid product was cooled to room temperature. A 1.0 to 2.0 g sample of the product was then dried in a vacuum oven at 80° C. for several hours. The percent solids of the product was determined as 48.6%. The mol ratio of the product was 0.5:1.5:1.0 for phthalic acid/maleic anhydride:ETHOMEEN® 18-12.

Infrared spectra showed two strong bands of ester carbonyl (COOR) at 1725 $cm^{-1}$ and carboxylate (COO$^-$) at 1590 $cm^{-1}$ and a broad absorption band at 2600 $cm^{-1}$.

EXAMPLE 3

Reaction of Maleic Anhydride:Phthalic Acid:Diethoxylated Coco Amine in Water

A 1-L resin reactor flask equipped with a stirrer, thermometer, reflux condenser and $N_2$ blanketing tube connected to nitrogen gas source was charged with 67.34 grams of ETHOMEEN® C-12 (0.229 mols; molecular weight 294.34), 16.94 grams of phthalic anhydride (0.114 moles; molecular weight 148.12), 33.65 grams of maleic anhydride (0.343 moles; molecular weight 98.06) and 482.06 grams of tap water.

The system was heated to 62° C. with stirring at 250 RPM to slowly disperse the solids in the water system. Stirring speed was increased to 300 RPM and the reaction system was heated further to 100°–102° C. and held at reflux for 2 hours. The product produced was a light amber clear liquid. The heat source was removed and the batch cooled to 35° C. over 1¾ hours with constant stirring.

Properties of the finished product were determined as follows:

Appearance: Clear straw yellow liquid

Gardner Color: 2

Viscosity: 11.4 cP (Brookfield RVT Model,50 RPM, 23° C.)

% Solids: 20.57 (70° C.,20" vacuum, overnight)

Acid Value: 80.56

EXAMPLES 4–7

Additional Amine Additives

Reactions according to EXAMPLE 3 and using identical molar quantities of components were carried out with the following polyethoxylated amine(s):

EXAMPLE 4: ETHOMEEN® 18-25, molecular weight 969.92

EXAMPLE 5: ETHOMEEN® C-25, molecular weight 873.18

EXAMPLE 6: ETHOMEEN® 18-60, molecular weight 2470

EXAMPLE 7: ETHOMEEN® 18-12, molecular weight 354.15

TABLE 1

| Anti-Settling Amine co-agents: For Directional Drilling Muds | | | | | | |
|---|---|---|---|---|---|---|
| Reference and Composition | Molar Ratio | Gardner Color | Appearance | Visc. (cP) | % Solids | Acid Value |
| EXAMPLE 3 | | | | | | |
| ETHOMEEN ® C-12 | 1.0 | 2 | Straw-yellow clear fluid | 11.4 | 20.57 | 80.56 |
| Phthalic Anhydride | 0.5 | | | | | |
| Maleic Anhydride | 1.5 | | | | | |
| Tap Water | (80%) | | | | | |

TABLE 1-continued

Anti-Settling Amine co-agents: For Directional Drilling Muds

| Reference and Composition | Molar Ratio | Gardner Color | Appearance | Visc. (cP) | % Solids | Acid Value |
|---|---|---|---|---|---|---|
| EXAMPLE 4 | | | | | | |
| ETHOMEEN® 18–25 | 1.0 | 3 | Dark yellow clear fluid | 15.0 | 20.88 | 37.87 |
| Phthalic Anhydride | 0.5 | | | | | |
| Maleic Anhydride | 1.5 | | | | | |
| Tap Water | (80%) | | | | | |
| EXAMPLE 5 | | | | | | |
| ETHOMEEN° C-25 | 1.0 | 3+ | Dark yellow clear fluid | 14.2 | 20.65 | 40.46 |
| Phthalic Anhydride | 0.5 | | | | | |
| Maleic Anhydride | 1.5 | | | | | |
| Tap Water | (80%) | | | | | |
| EXAMPLE 6 | | | | | | |
| ETHOMEEN® 18–60 | 1.0 | 2+ | Yellow clear fluid | 24.8 | 21.00 | 18.03 |
| Phthalic Anhydride | 0.5 | | | | | |
| Maleic Anhydride | 1.5 | | | | | |
| Tap Water | (80%) | | | | | |
| EXAMPLE 7 | | | | | | |
| ETHOMEEN® 18/12 | 1.0 | 1+ | Straw-yellow clear liquid | 500 | 20.82 | 75.21 |
| Phthalic Anhydride | 0.5 | | | | | |
| Maleic Anhydride | 1.5 | | | | | |
| Tap Water | (80%) | | | | | |

EXAMPLE 8

Two Stage Prepartation of Amine Additives

This example represents a neat reaction of ethoxylated amine with the same molar ratios of phthalic and maleic anhydrides as in prior examples to yield an opaque tacky product at 100% solids as the first stage. The 100% solids product was then diluted with tap water with stirring to produce a finished product at 20% solids in water as the second stage of the reaction sequence.

The two stage reaction is described in detail as follows:

Stage 1

ETHOMEEN® C-12 (molecular weight 294.34; 182.39 grams, 0.6197 mols), phthalic anhydride (molecular weight 148.12; 45.89 grams, 0.3098 moles) and maleic anhydride (molecular weight 98.06; 91.14 grams, 0.9294 mols) were interacted in the presence of 5.58 grams of water (0.31 moles) by heating at 110° C. for 4 hours. The finished product was an amber opaque tacky solid with the following properties:

Appearance: Light amber cloudy slightly tacky wax
Acid Value: 250.3
Melting Point (° C.): 70

Stage 2

The 100% tacky solid of Stage 1 was then diluted with tap water; 165 grams of solid was diluted with 660 grams tap water, cautiously heated and stirred in a 1-L resin reactor set-up at 95° C. for 3 hours to produce a clear light amber liquid solution.

Evaluation and properties of the final product were:
Appearance: Yellow clear liquid
Gardner Color: 1
Acid Value: 75.91
% Solids: 20.89
Viscosity: 13.8 cP (Brookfield RVT Viscometer,#1 spindle, 50 RPM)

EXAMPLE 9–12

Reactions according to EXAMPLE 8 and using identical molar quantities of components were carried out with the following polyethoxylated amine(s):

EXAMPLE 9: ETHOMEEN® C-25
EXAMPLE 10: Varonic® U-215
EXAMPLE 11: ETHOMEEN® 18–25
EXAMPLE 12: ETHOMEEN® 18–12

The 2-stage reaction products are summarized in the following Table 2.

TABLE 2

Two-Stage Reaction: Amino-Ester Types
Anti-Settling Amine Co-Agents for Directional Drilling Muds

| Reference and Composition | Mols | Stage 1 Reaction Product Properties | | | | | | Stage 2 Solution Properties | | | | |
|---|---|---|---|---|---|---|---|---|---|---|---|---|
| | | Gardner Color | Appearance | Visc. (cP) | Melt Pt. (°C.) | % Solids | Acid Value | Gardner Color | Appearance | Visc. (cP) | % Solids | Acid Value |
| EXAMPLE 8 | | | | | | | | | | | | |
| ETHOMEEN ® C-12 | 1.0 | | Light amber | | 70 | | 250.29 | 2 | Yellow clear liquid | 16.4 | 20.31 | 33.11 |
| Phthalic Anhydride | 0.5 | | tacky | | | | | | | | | |
| Maleic Anhydride | 1.5 | | cloudy wax | | | | | | | | | |
| Tap Water | 0.5 | | | | | | | | | | | |
| EXAMPLE 9 | | | | | | | | | | | | |
| ETHOMEEN ® C-25 | 1.0 | | Light amber | 16,400 | | | 118.78 | 7 | Amber clear liquid | 18 | 20.00 | |
| Phthalic Anhydride | .05 | | clear liquid | | | | | | | | | |
| Maleic Anhydride | 1.5 | | | | | | | | | | | |
| Tap Water | 0.5 | | | | | | | | | | | |
| EXAMPLE 10 | | | | | | | | | | | | |
| Varonic U-215 | 1.0 | | Dark amber | 10,420 | | | 119.83 | 3 | Yellow amber clear liquid | 18.2 | 20.52 | 29.49 |
| Phthalic Acid | 0.5 | | clear | | | | | | | | | |
| Maleic Acid | 1.5 | | viscous | | | | | | | | | |
| Tap Water | 0.5 | | liquid | | | | | | | | | |
| EXAMPLE 11 | | | | | | | | | | | | |
| ETHOMEEN ® 18–25 | 1.0 | | Amber | 19,200 | | | 108.39 | 3 | Amber clear, very viscous liquid | 18 | | 29.5 |
| Phthalic anhydride | 0.5 | | clear, very | | | | | | | | | |
| Maleic Anhydride | 1.5 | | viscous | | | | | | | | | |
| Tap Water | 0.5 | | liquid | | | | | | | | | |
| EXAMPLE 12 | | | | | | | | | | | | |
| ETHOMEEN ® 18–12 | 1.0 | | Light amber | | ND | | 227 | | | 6700 | | 69.9 |
| Phthalic anhydride | 0.5 | | tacky solid | | | | | | | | | |
| Maleic Anhydride | 1.5 | | | | | | | | | | | |
| Tap Water | 0.5 | | | | | | | | | | | |

EXAMPLE 13

In order to show the improvements available in the use of the amine additives of this invention, a series of experiments were conducted. The following technique was employed: prepared. Wyoming bentonite (5–9 ppb) was then added. The mud formulation, which used both a primary and secondary emulsifier, barite and a fluid loss additive was as follows. The difference between a field formula and a lab formula is shown:

| Trade Formulation | Field Name | Lab Formula | Formula | Mix Step | Time |
|---|---|---|---|---|---|
| Conoco LVT (200 bbl × 350 = mL) | | 0.57 bbl | 200.0 mL | 1 | |
| Primary Emulsifier | Invermul NT | 9.0 lb | 9.0 g | 1 | |
| Secondary Emulsifier | EZMUL NT | 2.0 lb | 2.0 g | 1 | |
| Brine Mix, 30% Calcium Chloride in Fresh Water | | 0.17 bbl | 60.0 mL | 1 | 5 min |
| Organoclay | | 6.0 lb | 6.0 g | | |
| Clay (Wyoming Bentonite) | | 5.0 lb | 5.0 g | 2 | 15 min |
| Barite | | 325.0 lb | 325.0 g | 3 | |
| Fluid Loss Additive | Duratone HT | 8.0 lb | 8.0 g | 3 | 10 min |
| Amine Additive | | 6.0 lb | 6.0 g | 4 | 25 min |

MIXING TECHNIQUES

The amine additive was incorporated into an oil-invert drilling mud using a laboratory Hamilton Beach mixer set on high speed. It was added at a level of 3 to 8 pounds per barrel (ppb) at the end of the base mud mix cycle and incorporated into the mud for 15–30 minutes, depending on test being performed. Approximately 1 lab barrel or 350 mL was prepared.

The low shear viscosity of muds containing the inventive entities of this application were determined using a Brookfield viscometer, Model LVT, equipped with #3 spindle after equilibrating the samples to 77° F. Dial readings were taken after 3 revolutions at 30 RPM or 1 minute at 0.3 RPM.

The muds were charged to a glass jar, sealed and placed in a roller oven at 150° F. for 16 hours. After re-equilibrating to 77° F., the Brookfield viscosities were determined as above. EXAMPLE 7 was considered to be representative of EXAMPLES 2 as the only variation was the process used with the reaction chemicals being the same. The results are shown in the table below:

TABLE 3

Brookfield LVT Viscosities Of Invert Oil Muds Formulated With Inventive Amino Additives

| | Brookfield LVT Viscosity (#3 Spindle) | | | |
|---|---|---|---|---|
| | Initial | | After Hot Rolling @ 150° F. | |
| Additive | 0.3 RPM | 30 RPM | 0.3 RPM | 30 RPM |
| Blank (None) | 31200 | 832 | 3480 | 920 |
| EXAMPLE 3 | 106000 | 2612 | 10120 | 2920 |
| EXAMPLE 4 | 80400 | 2308 | 7680 | 2296 |
| EXAMPLE 5 | 69600 | 2132 | 6280 | 1864 |
| EXAMPLE 6 | 76400 | 2096 | 4480 | 1392 |
| EXAMPLE 7 | 144000 | 3656 | 343200 | 2936 |
| EXAMPLE 8 | ND[1] | ND | 56000 | 1540 |
| EXAMPLE 9 | ND | ND | 37000 | 1020 |
| EXAMPLE 11 | ND | ND | 41000 | 1180 |
| EXAMPLE 12 | 54000 | 1280 | 64000 | 1700 |

[1]ND = Not Determined

EXAMPLE 14

Using the techniques and mud formulation described in EXAMPLE 13 and the amine reaction product of EXAMPLE 7, a series of tests were performed using the amine additive in combination with Wyoming bentonite, hectorite, calcium bentonite (Rev Dust) and attapulgite clay as the inventive examples and the amino additive with hydroxyethyl cellulose, calcium carbonate and kaolin clay as comparative examples to demonstrate the improvement made possible with the instant invention. The results are shown in FIGS. 1a, 1b and 2 and are more fully explained in the section entitled "Brief Description of the Drawings" above.

Figure 3:
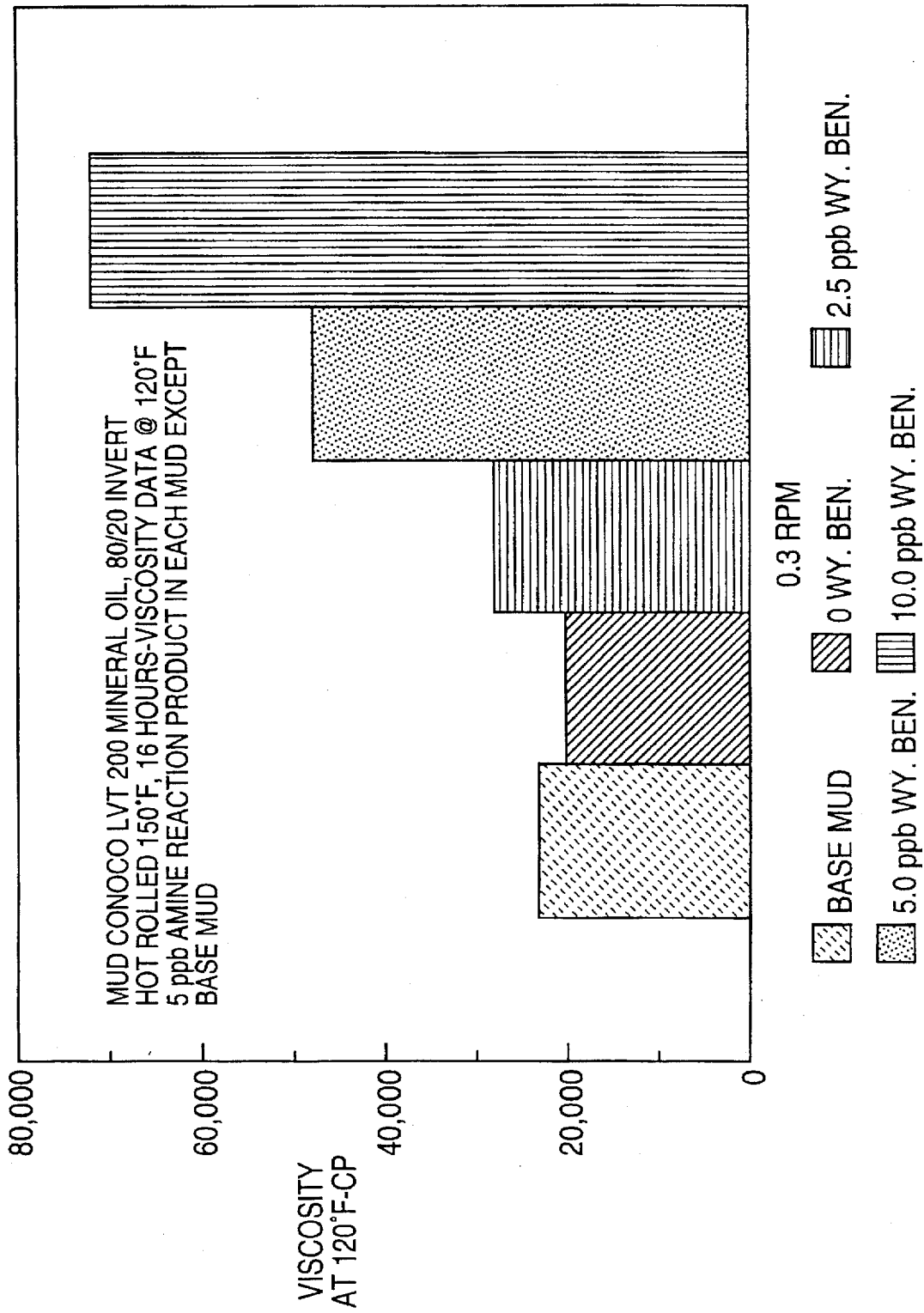
FIG. 3 demonstrates that similar enhancements in low shear performance can be achieved at a given loading of the amine salt by increasing the mount of rheologically active clay added to the drilling mud formulation.

Test results were run keeping constant the amine co-agent and varying the mount of rheologically active clay. The results are shown in FIG. 3 and also discussed in the above section.

While the present invention has been described with reference to particular embodiments thereof, it will be understood that numerous modifications can be made with those skilled in the art without actually departing from the scope of the invention. Accordingly, all modifications and equivalents may be resorted which fall within the scope of the invention as claimed.

We claim:

1. An oil well fluid anti-settling additive comprising a mixture of:
  a) one or more reaction products of one or more tertiary polyalkoxylated aliphatic amino compounds having a chemical structure represented by the following formula:

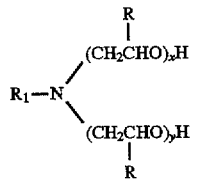

wherein $R_1$ is a straight chain alkyl group derived from fatty sources having 12 to 18 carbon atoms, R is selected from the group consisting of hydrogen, methyl and ethyl, both x and y are at least 1, and the sum of x+y is from 2 to 15; and one or more organic compounds selected from the group consisting of maleic anhydride, phthalic anhydride and mixtures thereof and;
  b) one or more rheologically active clay-based materials.

2. The oil well anti-settling additive of claim 1(a) wherein one or more of the reaction products is a salt.

3. The oil well fluid anti-settling additive of claim 1 wherein the rheologically active clay-based material is selected from the group consisting of organoclays, smectite-type clays and attapulgite clay.

4. The oil well fluid anti-settling additive of claim 1 wherein the rheologically active clay-based material is Wyoming bentonite.

5. An improved oil well drilling fluid containing:
  a) one or more reaction products of one or more polyalkoxylated aliphatic amino compounds having a chemical structure represented by the following formula:

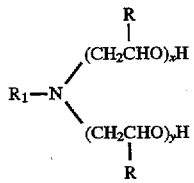

wherein $R_1$ is a straight chain alkyl group derived from fatty sources having 12 to 18 carbon atoms, R is selected from the group consisting of hydrogen, methyl and ethyl, both x and y are at least 1, and the sum of x+y is from 2 to 15, and one or more organic compounds selected from the group consisting of maleic anhydride, phthalic anhydride and mixtures thereof and;
  b) one or more rheologically active clay-based materials.

6. The drilling fluid of claim 5 wherein the rheologically active clay-based material is selected from the group consisting of organoclays, smectite-type clays and attapulgite clay.

7. The method of claim 5 wherein the rheologically active clay-based material is Wyoming bentonite.

8. A method of providing improved anti-settling properties to an oil well drilling fluid comprising:
  a) preparing an oil well drilling fluid and;
  b) incorporating into such drilling fluid:
    i. one or more reaction products of one or more polyalkoxylated aliphatic amino compounds having a chemical structure represented by the following formula:

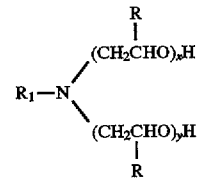

wherein $R_1$ is a straight chain alkyl group derived from fatty sources having 12 to 18 carbon atoms, R is selected from the group consisting of hydrogen, methyl and ethyl, both x and y are at least 1, and the sum of x+y is from 2 to 15 and one or more organic compounds selected form the group consisting of maleic anhydride, phthalic anhydride and mixtures thereof and;

ii. one or more rheologically active clay-based materials.

9. The method of claim 8 wherein the reaction product of subparagraph b) i, and the rheologically active clay-based material of subparagraph b)ii, are simultaneously incorporated into the drilling fluid.

10. The method of claim 8 wherein one or more rheologically active clay-based materials are incorporated first into the oil well drilling fluid.

11. The method of claim 8 wherein one or more rheologically active clay-based materials become incorporated into the drilling mud as a result of contact of the fluid with earth formations of rheologically active clay during use of the fluid in drilling operations.

12. The method of claim 8 wherein one or more of the reaction products of subparagraph b)i, is a salt.

13. The method of claim 8 wherein the rheologically active clay-based materials are selected from the group consisting of organoclays, smectite-type clays and attapulgite clay.

14. The oil method of claim 13 wherein the smectite-type clay is Wyoming bentonite.

* * * * *